Patented Feb. 15, 1944

2,341,661

UNITED STATES PATENT OFFICE 2,341,661

TOOL AND HOLDER THEREFOR

Frank W. Schillberg, Bridgeport, Conn., assignor to Auto-Ordnance Corporation, Bridgeport, Conn., a corporation of New York Application October 9, 1942, Serial No. 461,503

2 Claims. (Cl. 29—100)

My invention relates to an improvement in tools and is particularly directed to threading tools.

One of the objects of my invention is the provision of an improved threading tool wherein the holder and cutter are of new and novel construction and wherein the minimum of skill is required in assembling the same both initially and after use, my construction being such that I am assured that work done with the tool will be accurately formed.

Further objects and advantages of my invention will appear hereinafter.

In the accompanying drawing wherein I have illustrated an embodiment of my invention:

Figure 1:
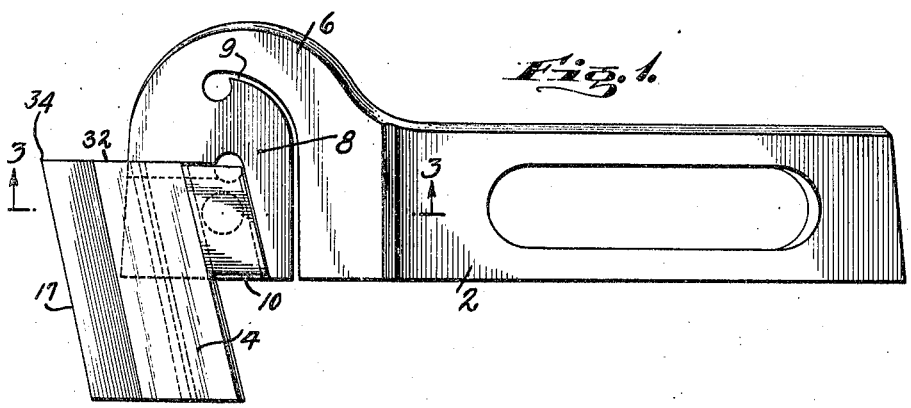
Fig. 1 is a side elevational view of a tool constructed in accordance with my invention.

Referring to the drawing in detail: 2 designates the tool holder for mounting the cutter 4 of a thread cutting tool. The tool holder is of the spring type, namely, of the type wherein the tool is allowed to yield upon encountering a tough area in the work-piece or when an extremely heavy cut is taken; and comprises a shank adapted to be received by the usual toolpost, an integral gooseneck 6 and underlying head 8 integral with the gooseneck but spaced therefrom by a slot 9.

The head 8 of the tool holder is provided in one face with a groove 10 for receiving the cutter 4, this groove, as will be seen from Fig. 1, for example, extending upwardly and forwardly of the tool holder head from the bottom thereof diagonally of the longitudinal axis of the holder. The sides 12 of this groove slope rearwardly of the head relatively to the bottom of the groove.

The cutter 4, as will be seen from the drawing, is an elongated steel block initially ground for its entire length to the proper shape or angle, and it is one of the objects of my invention to assure the preservation of this angle throughout the life of the tool regardless of the number of times the tool is ground to restore its cutting point.

The lower face of the cutter 4 is provided with a flat area 14 extending the length of the cutter from top to bottom, and to the rear of this flat area the cutter is thickened to provide a heavy flange 16 extending lengthwise of the cutter from top to bottom, this flange being parallel to the cutter edge 17. The front edge 18 of the flange 16 is shaped to the same angle as the cooperating side 12 of the cutter-receiving groove 10.

In assembling the cutter and holder, the cutter simply is slid endwise into the groove 10 through the lower end of the groove with the front edge or face 18 of the flange in contact with the adjacent side 12 of the groove 10. The depth of the flange 16 is equal to the depth of the groove 10 at the cutter side of the groove so that the flat 14 of the cutter will rest upon the holder face and the bottom or lower face of the flange will bottom in the groove.

Figure 2:
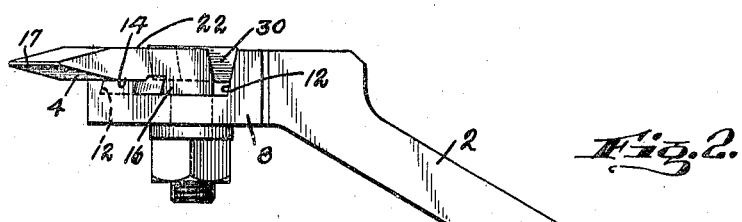
Fig. 2 is a bottom plan view of Fig. 1.
Figure 3:
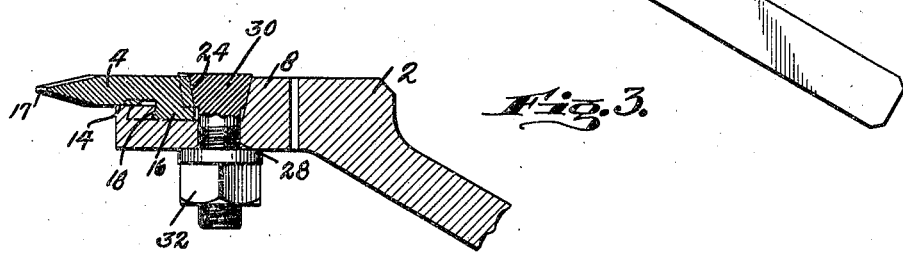
Fig. 3 is a section on the line 3—3 of Fig. 1.
Figure 4:
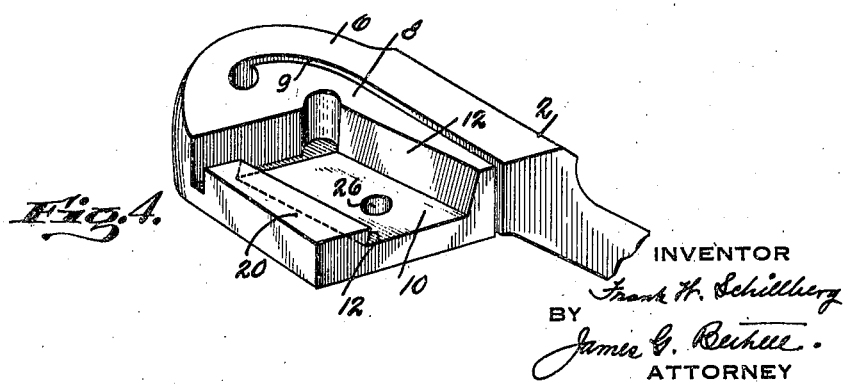
Fig. 4 is a fragmentary perspective view of the tool with its cutter removed.

In order that the outer face of the cutter will be substantially flush with the holder face when the parts are assembled, the metal of the holder is removed at 20. With this construction, as illustrated in Fig. 2, the side or face 22 of the cutter is substantially flush with the face of the holder head, with the flange 16 bottoming in the groove 10.

The rear edge of the cutter which extends parallel to the front edge 17 is bevelled, as shown at 24, to the same angle as the rear face 12 of the tool-receiving groove 10 but in the opposite direction, so that when the cutter is in place in the holder a dovetailed slot extending parallel to the cutter edge 17 is provided between the rear edge of the cutter and the rear sidewall 12 of the groove 10.

In the bottom of the space thus provided the groove 10 is provided with a hole 26 to the rear of the cutter for receiving a clamping bolt 28. This bolt has a rectangular head 30 the sides of which are bevelled to the angles of the bevel 24 of the cutter and the rear side wall 12 of the groove 10, so that when the nut 32 is set up the cutter is rigidly held in the groove 10 of the tool holder head.

The advantages of my improved tool holder will now be aparent to those skilled in this art.

Rigidity of the cutter in the tool holder head is assured by the long bearing surfaces provided between the lower faces of the cutter and the area 20 of the tool holder head and the bottom of the groove 10, and between the cutter and the cooperating side of the cutter-receiving groove 10, as well as between the rear edge of the cutter, the two sides of the elongated head 30 of the bolt 28 and the rear sidewall 12 of the groove 10. The front edge 17 of the cutter, the rear edge of the cutter, the sides of the groove 10 and the sides of the head of the clamping bolt all extend parallel to each other so that in assembling the cutter will be disposed at the desired angle in the holder head.

It will be appreciated furthermore, that after each grinding operation when the upper edge 32 is ground to renew or sharpen the cutting point 34, it is merely necessary to move the cutter forward in the groove 10 until the edge 32 abuts the end of the groove, when the cutter is in operative position again, and the angle of the edge 17 as well as the angle this edge makes with the holder head are precisely the same as they were originally.

It is to be understood that changes may be made in the details of construction and arrangement of parts within the purview of my invention.

What I claim is:

1. In combination a tool holder, an elongated cutter having a straight continuous forward edge extending the length of the cutter, the extremity of this edge cooperating with the inner end of the cutter to provide a cutting point or area, a groove in the side of the tool holder head for receiving said cutter, said groove being open at its outer end and closed at its inner end, said cutter being provided along its rear edge with a dovetail flange extending parallel to the forward edge of the cutter and adapted to be inserted in said groove with one side of the flange in engagement with one side of said groove, and a clamp adapted to be wedged between the rear bevelled edge of the cutter and the rear edge of the said groove to clamp the cutter against movement relatively to the tool holder head with the inner end or face of the cutter in engagement with the closed end of the groove, said cutter being movable forwardly in a straight line inwardly of said groove upon loosening the clamp to take up for wear due to grinding away of the inner end or face of the cutter without alteration of the angle between the forward edge of the cutter and the tool holder head.

2. In combination a tool holder for thread-cutting tools, a thread-cutting cutter having a straight continuous forward edge which is shaped throughout its length to the angle of the thread to be cut, a flange at the opposite edge of the cutter which extends parallel to said forward edge, a groove in the head of the tool holder for receiving the said flange, said groove being open at its outer end and closed at its inner end and so located that with the cutter in place the said forward edge of the cutter will project beyond the front of the holder head with the inner end of the cutter abutting the closed end of the groove, and a clamping bolt passing through the holder head intermediate the ends of the groove, said bolt having a head adapted to be wedged between the rear edge of the cutter and the rear wall of said groove to jam or wedge said flange against the front wall of the groove, said construction permitting the forward end of the cutter to be ground away to sharpen the cutter without alteration of the forward edge thereof and to be moved inwardly of said groove again to engage the closed end of the groove without alteration of the angle between the holder and the cutter.

FRANK W. SCHILLBERG